US012481780B2

(12) United States Patent
Khan et al.

(10) Patent No.: US 12,481,780 B2
(45) Date of Patent: Nov. 25, 2025

(54) SYSTEMS AND METHODS FOR POLICY-BASED ACCESS TO DISTRIBUTED LEDGER VIA SECURE ACCESS NODE

(71) Applicant: Verizon Patent and Licensing Inc., Basking Ridge, NJ (US)

(72) Inventors: Ahmed A. Khan, Plano, TX (US); Mohammed Alsadi, Redmond, WA (US); Salman Ali Danish Mohammed, Wylie, TX (US); Nityanand Sharma, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 211 days.

(21) Appl. No.: 18/357,283

(22) Filed: Jul. 24, 2023

(65) Prior Publication Data

US 2025/0036792 A1    Jan. 30, 2025

(51) Int. Cl.
    *G06F 21/62*    (2013.01)
(52) U.S. Cl.
    CPC ................. *G06F 21/6227* (2013.01)
(58) Field of Classification Search
    USPC .......................................... 726/30
    See application file for complete search history.

(56) References Cited

U.S. PATENT DOCUMENTS

| | | | |
|---|---|---|---|
| 2020/0034334 A1* | 1/2020 | Lu | H04L 9/0637 |
| 2021/0352080 A1* | 11/2021 | Simons | H04L 9/0618 |
| 2022/0147983 A1* | 5/2022 | Marsh | G06Q 20/10 |
| 2022/0150070 A1* | 5/2022 | Nath | G06F 11/3055 |
| 2024/0421973 A1* | 12/2024 | Zhang | H04L 9/50 |

* cited by examiner

Primary Examiner — Sanchit K Sarker

(57) ABSTRACT

A system described herein may maintain a local copy of a distributed ledger, including a first set of records that each include payload information. The system may maintain a restricted access ledger based on the distributed ledger, including a second set of records that include modified payload information included in the first set of records of the distributed ledger. The system may receive a request to access the distributed ledger, including one or more attributes, and may determine, based on the one or more attributes of the request, whether to grant access to the distributed ledger or to the restricted access ledger. When determining to grant access to the distributed ledger, the system may provide payload information from the distributed ledger in response to the request, and when determining to grant restricted access to the restricted access ledger, the system may provide payload information from the restricted access ledger.

20 Claims, 14 Drawing Sheets

SYSTEMS AND METHODS FOR POLICY-BASED ACCESS TO DISTRIBUTED LEDGER VIA SECURE ACCESS NODE

BACKGROUND

Distributed ledgers, such as blockchains, provide for the decentralized and secure storage of data. Distributed ledgers may further provide for the immutability of recorded data, as data may not be altered once recorded to a distributed ledger. Distributed ledgers may be maintained by multiple nodes, such as geographically distributed or otherwise distinct servers, workstations, etc., that each maintain local copies of respective distributed ledgers.

DETAILED DESCRIPTION OF EXAMPLE EMBODIMENTS

The following detailed description refers to the accompanying drawings. The same reference numbers in different drawings may identify the same or similar elements.

Figure 1:
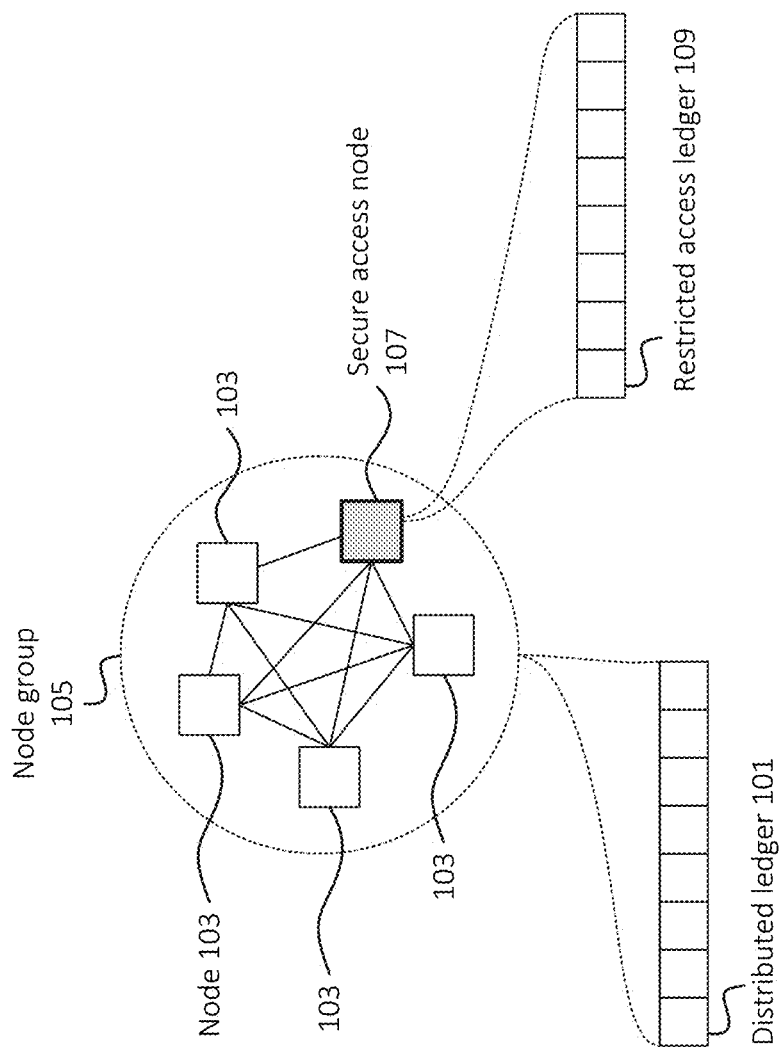
FIGS. 1 and 2 illustrate an example overview of one or more embodiments described herein.

Distributed ledgers may be maintained by multiple nodes, such as geographically distributed or otherwise distinct servers, workstations, etc., that each maintain local copies of respective distributed ledgers. For example, as shown in FIG. 1, a particular distributed ledger 101 may be established and/or maintained by a set of nodes 103 (e.g., node group 105). In some embodiments, nodes 103 may be implemented in a containerized environment, in which various containers, cloud systems, and/or other virtualized environments implement one or more nodes 103.

In accordance with some embodiments, one or more nodes of node group 105 may be, may include, and/or may implement Secure Access Node 107. As discussed below, Secure Access Node 107 may generate and/or maintain restricted access ledger 109 in addition to distributed ledger 101. For example, Secure Access Node 107 may perform some or all of the same operations as nodes 103 with respect to maintaining distributed ledger 101 (e.g., establishing distributed ledger 101, recording information to distributed ledger 101, participating in consensus or security mechanisms with respect to distributed ledger 101, etc.), and may also perform additional operations relating to accessing the information recorded to distributed ledger 101. In this manner, Secure Access Node 107 may be able to provide differentiated levels of access to distributed ledger 101, such as by providing unrestricted or full access to distributed ledger 101 to certain groups, devices, etc. (e.g., may provide access to full, unobscured data included in distributed ledger 101), and providing restricted access to distributed ledger 101 to other groups, devices, etc. (e.g., may provide access to scrambled, filtered, obscured, etc. data as included in restricted access ledger 109).

Figure 2:
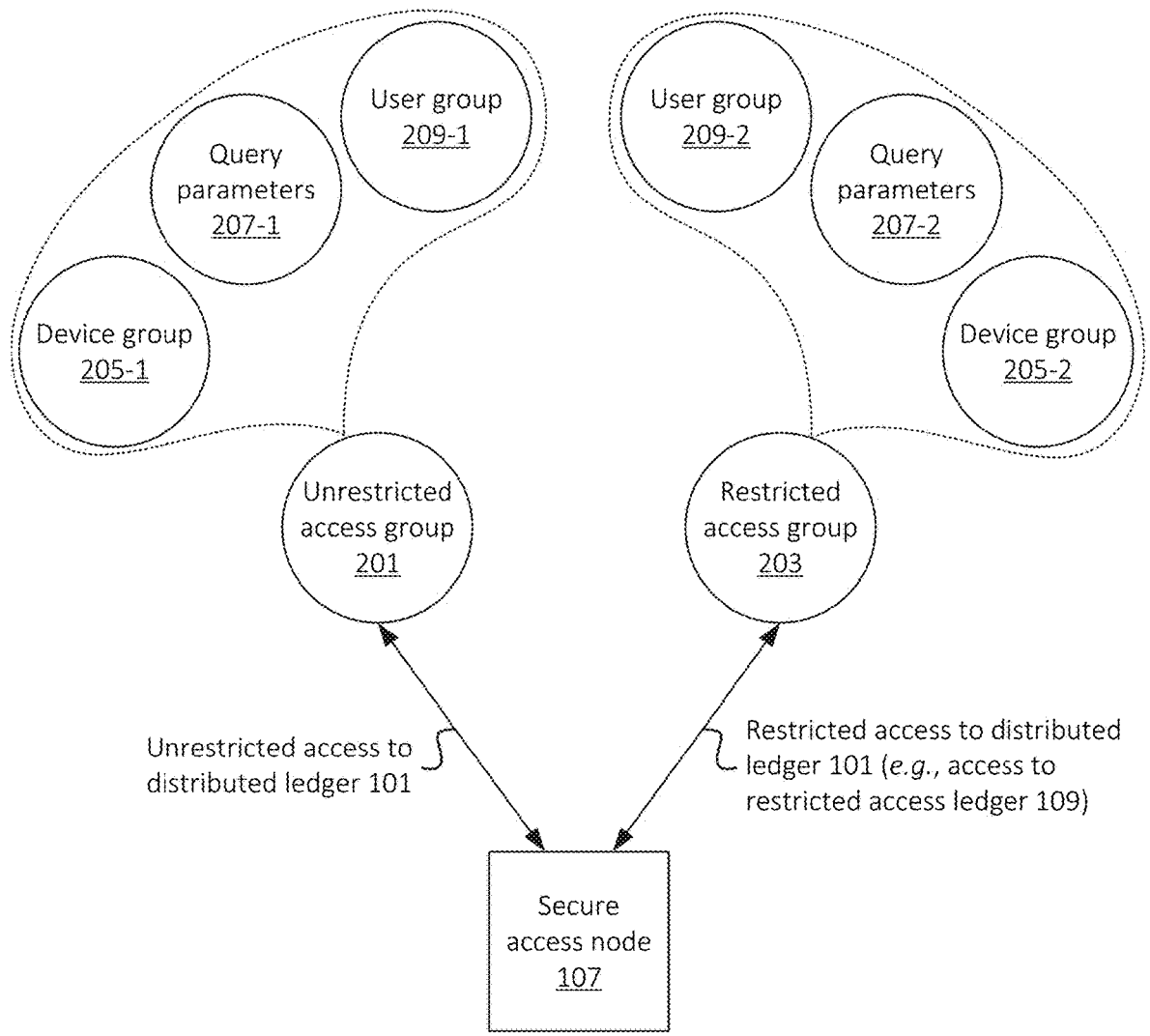

For example, as shown in FIG. 2 and in accordance with some embodiments, Secure Access Node 107 may provide, to unrestricted access group 201, unrestricted access to distributed ledger 101 and may provide, to restricted access group 203, restricted access to distributed ledger 101 (e.g., access to restricted access ledger 109). Restricted access ledger 109 may include, for example, portions of information recorded to distributed ledger 101, modified versions of information recorded to distributed ledger 101, metadata of records of distributed ledger 101, obscured versions of information recorded to distributed ledger 101, otherwise may include information derived from distributed ledger 101. Generally, unrestricted access group 201 may include users, devices, entities, etc. for which a distributed ledger access policy indicates that such users, devices, entities, etc. should have access to payload information or otherwise unrestricted access to distributed ledger 101, while restricted access group 203 may include users, devices, entities, etc. for which the distributed ledger access policy indicates that such users, devices, entities, etc. should not have access to payload information or otherwise restricted access to distributed ledger 101. For example, unrestricted access group 201 may include entities that handle sensitive information that may be recorded to distributed ledger 101 (e.g., financial information, proprietary business information, security information, etc.), while restricted access group 203 may include a support or Information Technology ("IT") department responsible for maintaining hardware, infrastructure, or other aspects of Secure Access Node 107 (e.g., where such aspects may be unrelated to the information stored in distributed ledger 101).

Unrestricted access group 201 and restricted access group 203 may be defined by or otherwise associated with various parameters, criteria, conditions, etc. such as device group 205, query parameters 207, user group 209, and/or other types of parameters, criteria, etc. For example, unrestricted access group 201 may include a first device group 205-1, a first set of query parameters 207-1, a first user group 209-1, etc., and restricted access group 203 may include a second device group 205-2, a second set of query parameters 207-2, a second user group 209-2, etc. Device groups 205 may be defined or otherwise associated with different device identifiers (e.g., Internet Protocol ("IP") addresses, International Mobile Station Equipment Identity ("IMEI") values, International Mobile Subscriber Identity ("IMSI") values, Subscription Permanent Identifier ("SUPI") values, Globally Unique Temporary Identifier ("GUTI") values, Mobile Directory Numbers ("MDNs"), etc.). Additionally, or alternatively, device groups 205 may be defined or associated with other types of characteristics, attributes, categories, etc.

of devices (e.g., mobile phone, Internet of Things ("IoT") device, "first responder" category, device operating system, etc.).

Query parameters 207 may refer to parameters of queries or requests to access distributed ledger 101. Query parameters 207 may include, for example, keywords, information types, times of the day at which queries are submitted, and/or other suitable query parameters 207. User groups 209 may include types or attributes of users who submit queries or requests to access distributed ledger 101, such as user names, user locations, user categories or groups (e.g., different departments within an organization), and/or other suitable identifiers or categories of users.

Figure 3:
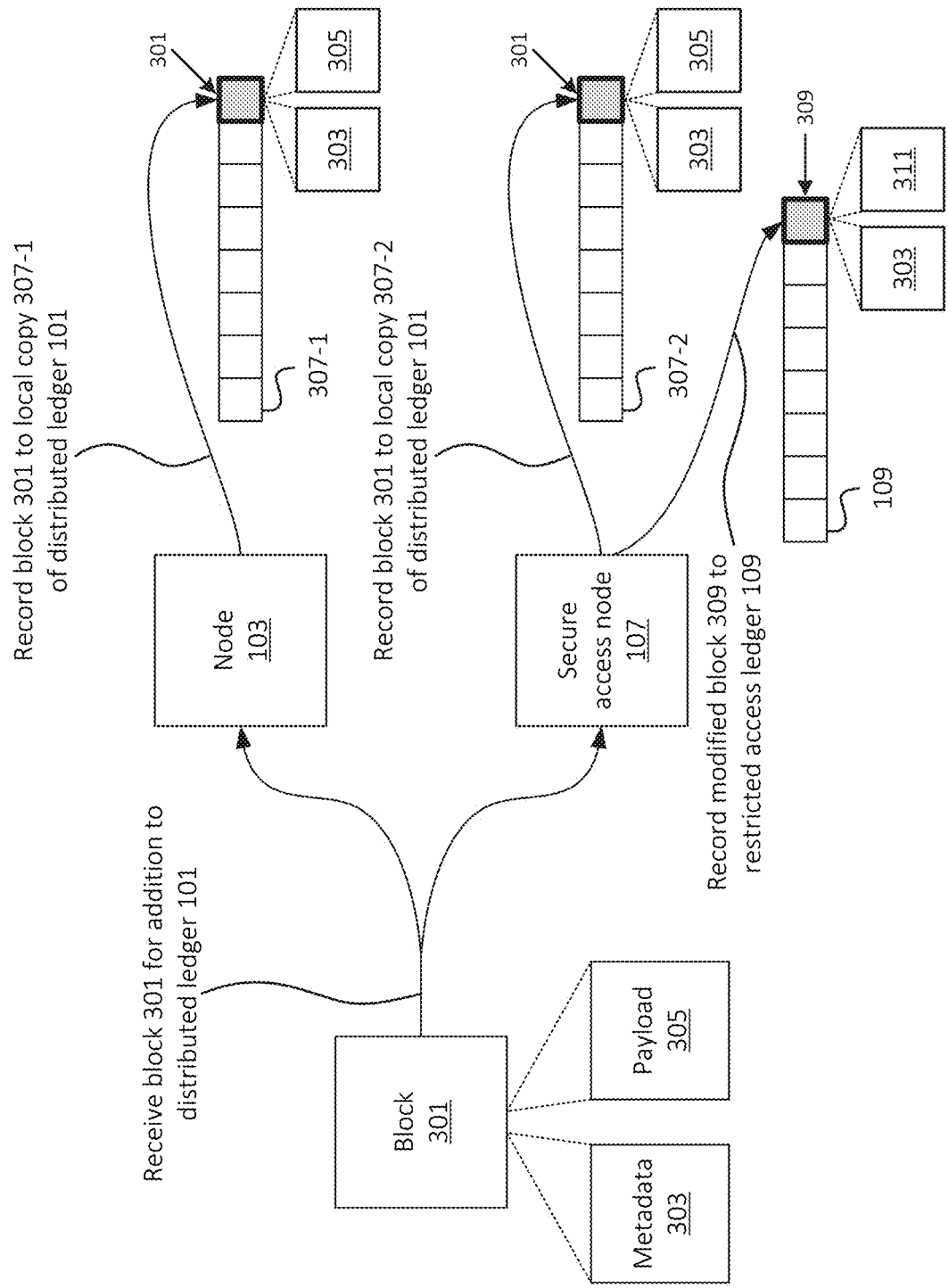
FIGS. 3 and 4 illustrate an example of recording information to a distributed ledger and corresponding modified information to a restricted access ledger, in accordance with some embodiments.

FIG. 3 illustrates an example of maintaining restricted access ledger 109 by Secure Access Node 107, such as in situations where new information is to be recorded to distributed ledger 109. As shown, block 301 may be received by Secure Access Node 107 and one or more other nodes 103 (e.g., nodes of a particular node group 105). As discussed below, block 301 may be proposed or submitted by one or more nodes 103, approved or verified via a consensus mechanism of some or all nodes 103, etc. Block 301 may include metadata 303 and payload 305. Metadata 303 may include, for example, a block identifier, a sequence number, a transaction hash, a timestamp (e.g., a time at which block 301 was submitted or approved), an identifier of an entity from which the block was received, and/or other suitable metadata. In some embodiments, payload 305 may include substantive data to be recorded to distributed ledger 101. Payload 305 may potentially include sensitive data, such as passwords, financial information, user information, keys, or any other suitable type of information. Generally, payload 305 may include information that may be accessible to unrestricted access group 201 but inaccessible to restricted access group 203, in accordance with some embodiments. On the other hand, as discussed herein, some or all of metadata 303 may be accessible to both unrestricted access group 201 and restricted access group 203.

When receiving block 301, node 103 and Secure Access Node 107 may both record block 301 to a respective local copy 307 of distributed ledger 101. For example, node 103 may record (e.g., append or otherwise add) block 301 to local copy 307-1 of distributed ledger 101, while Secure Access Node 107 may record block 301 to local copy 307-2 of distributed ledger 101. Additionally, Secure Access Node 107 may also record a modified version of block 301 (referred to as modified block 309) to restricted access ledger 109. Modified block 309 may include, for example, metadata 303 and a modified version of payload 305 (referred to as modified payload 311). Modified payload 311 may include, for example, a scrambled, obscured, hashed, or other modified version of the contents of payload 305. Additionally, or alternatively, modified payload 311 may include a placeholder value, a null value, a random value, and/or other suitable information that is different from (e.g., replaces some or all of) payload 305.

In some embodiments, modified payload 311 may include a portion of payload 305 but not all of payload 305. For example, Secure Access Node 107 may perform a filtering operation in which Secure Access Node 107 identifies and removes potentially sensitive information from payload 305, without removing or modifying other information. For example, in an example where payload 305 includes the text "Address: 123 Elm Street," corresponding modified payload 311 may include the text "Address: XXXXXXX." Secure Access Node 107 may perform pattern matching, Natural Language Processing ("NLP") techniques, artificial intelligence/machine learning ("AI/ML") techniques, or other suitable techniques in order to perform such filtering or masking, to generate modified payload 311 based on payload 305.

Figure 4:
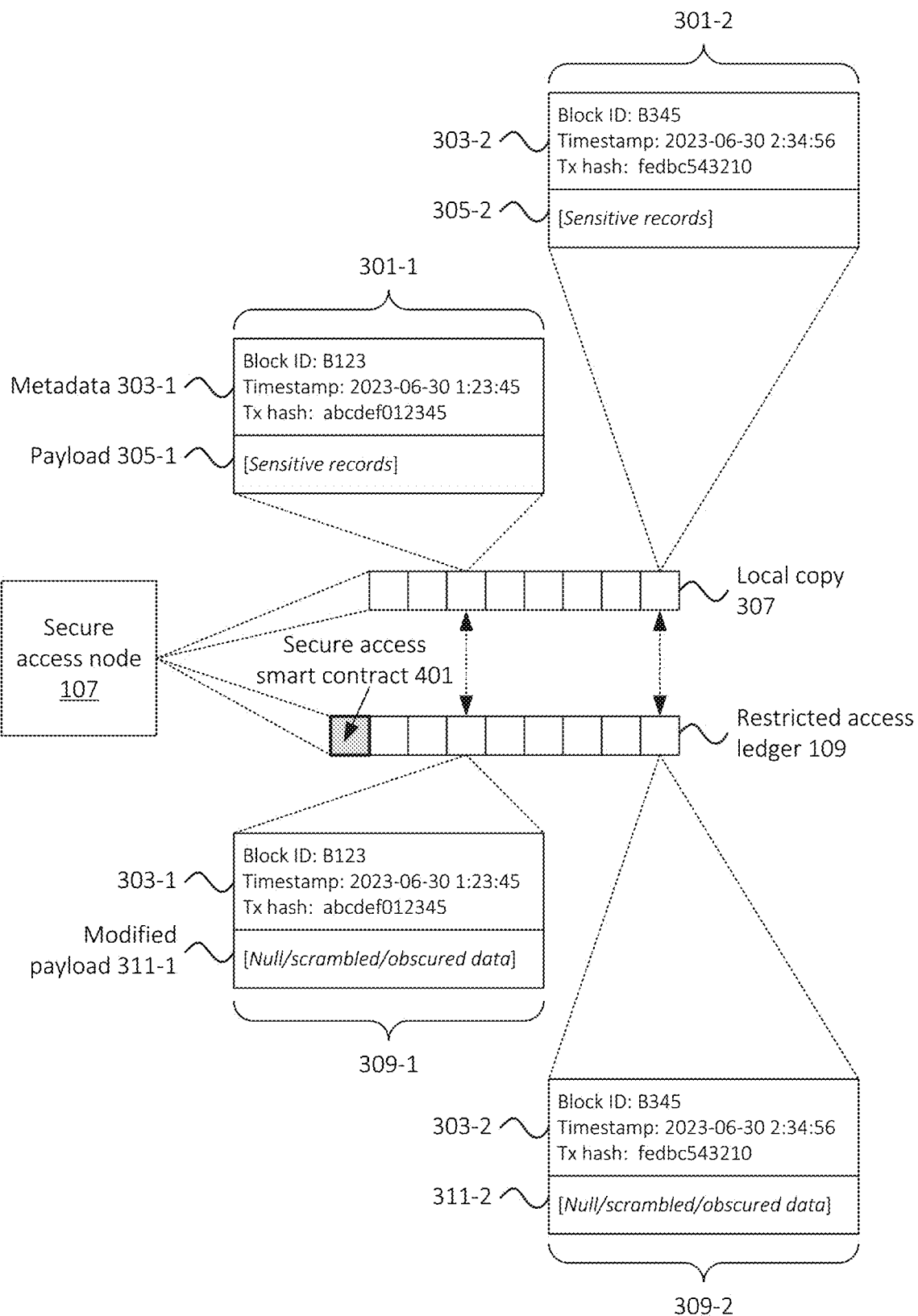

FIG. 4 illustrates a further example of local copy 307 of distributed ledger 101 and restricted access ledger 109, as maintained by Secure Access Node 107. One example block 301-1, as recorded to local copy 307, may include metadata 303-1 and payload 305-1, while a corresponding modified block 309-1 may include the same metadata 303-1 and modified payload 311-1 that includes a modified, obscured, etc. version of payload 305-1. Similarly, block 301-2, as recorded to local copy 307, may include metadata 303-2 and payload 305-2, while a corresponding modified block 309-2 may include the same metadata 303-2 and modified payload 311-2 that includes a modified, obscured, etc. version of payload 305-2.

Restricted access ledger 109 may also include secure access smart contract 401. As discussed below, secure access smart contract 401 may include executable code or instructions (e.g., "chaincode") or other mechanisms that generate output values based on input values. Secure access smart contract 401 may be recorded to restricted access ledger 109 "out of band" with the operation of distributed ledger 101. For example, secure access smart contract 401 may be recorded to restricted access ledger 109 without consensus from other nodes 103 of a given node group 105. Further, while this example shows one instance of secure access smart contract 401 recorded to restricted access ledger 109, in practice multiple instances of secure access smart contract 401 may be recorded to restricted access ledger 109, such as in situations where the access policies provided via secure access smart contract 401 are modified, updated, etc. In such scenarios, when invoking secure access smart contract 401, Secure Access Node 107 may identify the latest or most recent instance of secure access smart contract 401. Secure access smart contract 401 may include or may be based on access policies that indicate devices, users, query parameters, or other attributes or factors that are authorized, or not authorized, to access distributed ledger 101 (e.g., unrestricted access to payloads 305 of blocks 301 recorded to distributed ledger 101).

Figure 5:
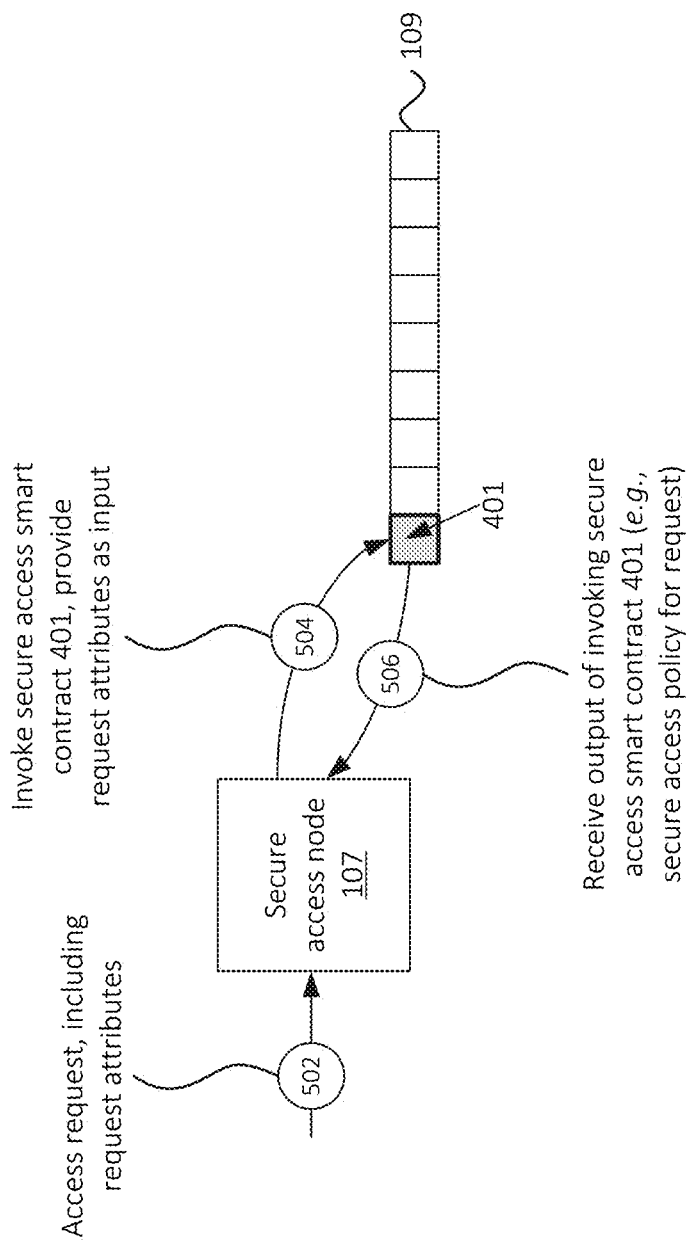
FIGS. 5-7 illustrate examples of selectively providing access to a distributed ledger or a restricted access ledger, in accordance with some embodiments.

As shown in FIG. 5, for example, secure access smart contract 401 may be used to determine whether a given request to access distributed ledger 101 should be treated as a restricted access request or an unrestricted access request. As shown, for example, Secure Access Node 107 may receive (at 502) a particular access request from a client, a workstation, or other type of device, system, or entity. Secure Access Node 107 may receive such request via an application programming interface ("API"), via a web portal, or other suitable type of communication pathway or interface. The access request may include or may be associated with parameters, attributes, etc., such as a time at which the request was submitted, a device identifier or other attributes of a device from which the request was submitted (e.g., a device type, a device category, a device location, etc.). Secure Access Node 107 may, based on receiving (at 502) the access request, invoke (at 504) secure access smart contract 401. For example, Secure Access Node 107 may execute chaincode or other instructions or operations indicated in secure access smart contract 401, providing the request attributes as input. The output (as received or determined at 506) of secure access smart contract 401 may specify whether the request should be treated as an unrestricted request or a restricted request.

Figure 6:
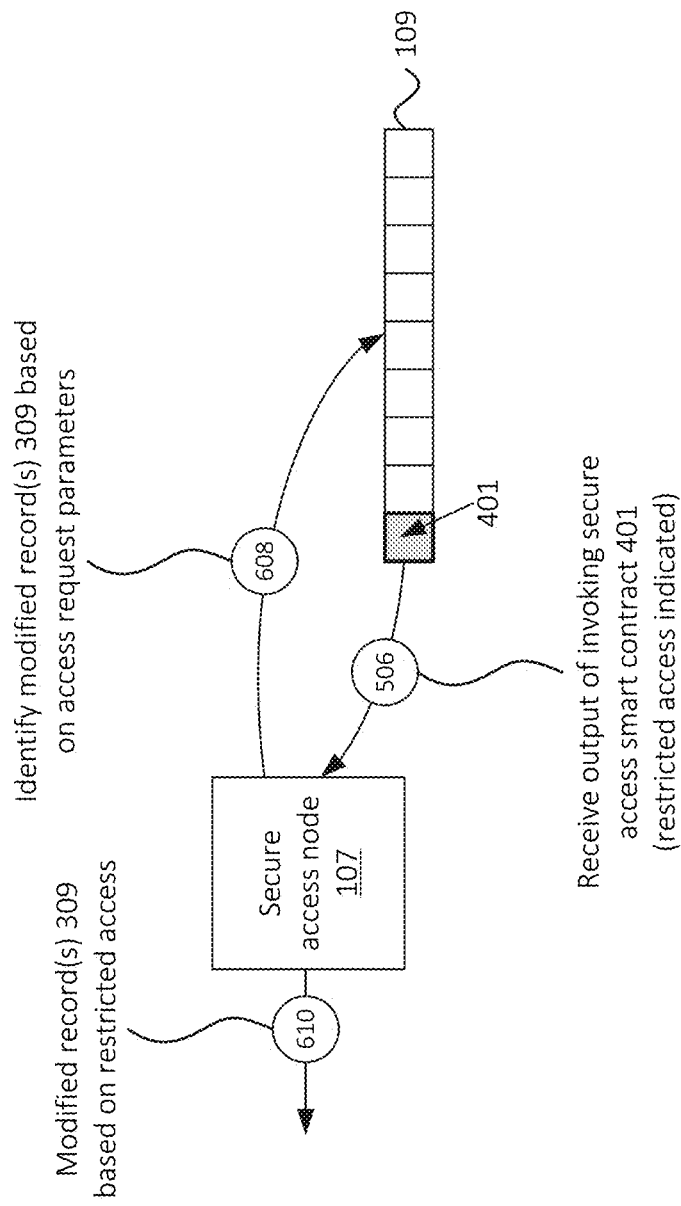

Referring to FIG. 6, assume that the output (at 506) of secure access smart contract 401 specifies that the request should be treated as a restricted access request. For example, assume that the access policies implemented by secure access smart contract 401 specify that an IT department of an organization does not have unrestricted access to payloads 305 of distributed ledger 101, but that such department does have restricted access. Further assume that Secure Access Node 107 provided (at 504) an indication that the request (received at 502) was from a device or user associated with the IT department of the organization. As such, the output (at 506) of secure access smart contract 401 may indicate that the request is a restricted access request. Accordingly, Secure Access Node 107 may access (at 608) restricted access ledger 109 to respond to the access request. In the event that the access request included one or more query parameters (e.g., keywords, block identifiers, transaction identifiers, timestamps, etc.), Secure Access Node 107 may search restricted access ledger 109 to identify one or more modified blocks 309 that meet the query parameters (e.g., match or include the keywords, match the block or transaction identifiers, match the timestamps, or otherwise meet the query parameters). Secure Access Node 107 may accordingly output (at 610) the identified modified blocks 309, including the corresponding metadata 303 and/or modified payloads 311, to the requestor. In this manner, since the access request was treated as a restricted access request, the actual underlying payloads 305 may not be provided, thus providing privacy and security with respect to distributed ledger 101, while still providing for maintenance of Secure Access Node 107 or other types of access to Secure Access Node 107.

Figure 7:
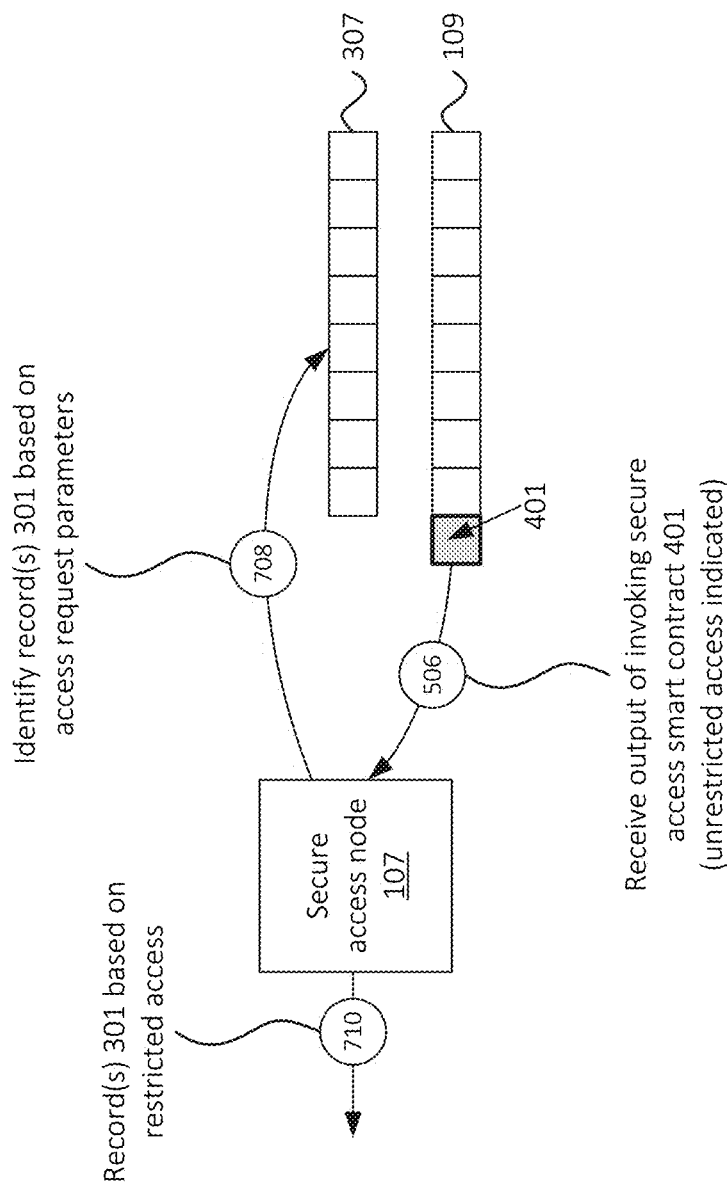

Referring to FIG. 7, on the other hand, assume that invoking (at 506) secure access smart contract 401 indicates that an access request is an unrestricted access request. In such situations, Secure Access Node 107 may identify (at 708) one or more blocks 301 of distributed ledger 101 (e.g., from local copy 307 of distributed ledger 101) that meet the access request (e.g., that meet query parameters), and may output (at 710) the identified blocks 301, including unmodified payloads 305 of such blocks 301. In this manner, entities for which access to distributed ledger 101 is authorized may be able to access such information via Secure Access Node 107.

Figure 8:
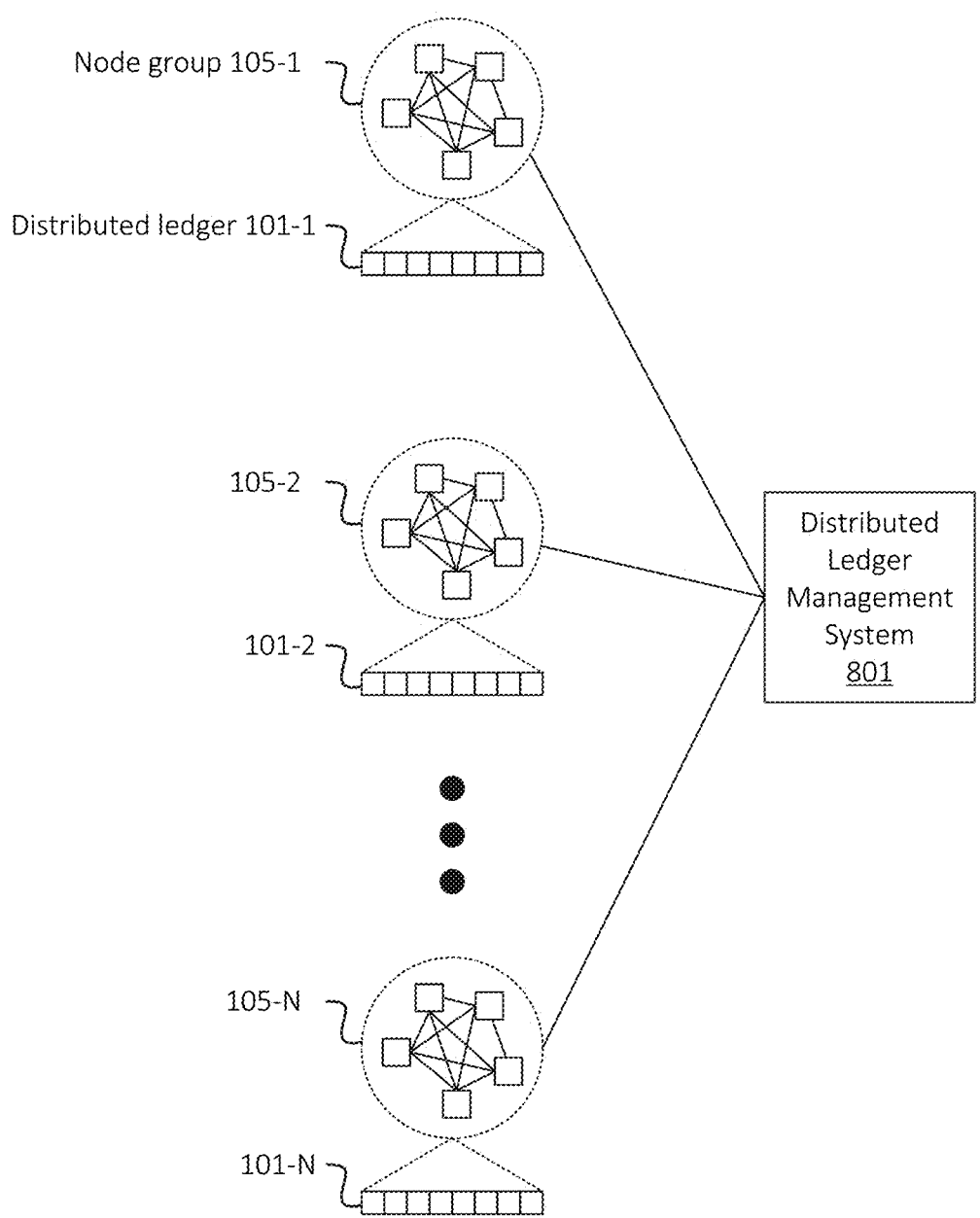
FIG. 8 illustrates an example arrangement of one or more node groups and/or distributed ledgers.

FIG. 8 illustrates an example distributed ledger environment in which multiple node groups 105 may maintain multiple distributed ledgers 101. For example, node group 105-1 may maintain distributed ledger 101-1, node group 105-2 may maintain distributed ledger 101-2, node group 105-N may maintain distributed ledger 101-N, and so on. In some embodiments, node groups 105 (e.g., respective nodes 103 and/or Secure Access Nodes 107 of node groups 105) may be managed, provisioned, configured, etc. by Distributed Ledger Management System ("DLMS") 801, which may be associated with a distributed ledger framework such as a Hyperledger® Fabric framework, a ConsenSys Software Inc.® Quorum® framework, an R3® Corda® framework, etc. DLMS 801 may establish communications between respective nodes 103 and/or Secure Access Nodes 107 that implement or maintain such distributed ledgers 101, assign roles to particular nodes 103 (e.g., ordering node, peer, etc.), manage access to respective distributed ledgers 101 (e.g., where one or more of such distributed ledgers 101 may be "private" or "permissioned" distributed ledgers), serving as an interface between distributed ledgers 101 and clients or other external devices, or other suitable operations.

Figure 9:
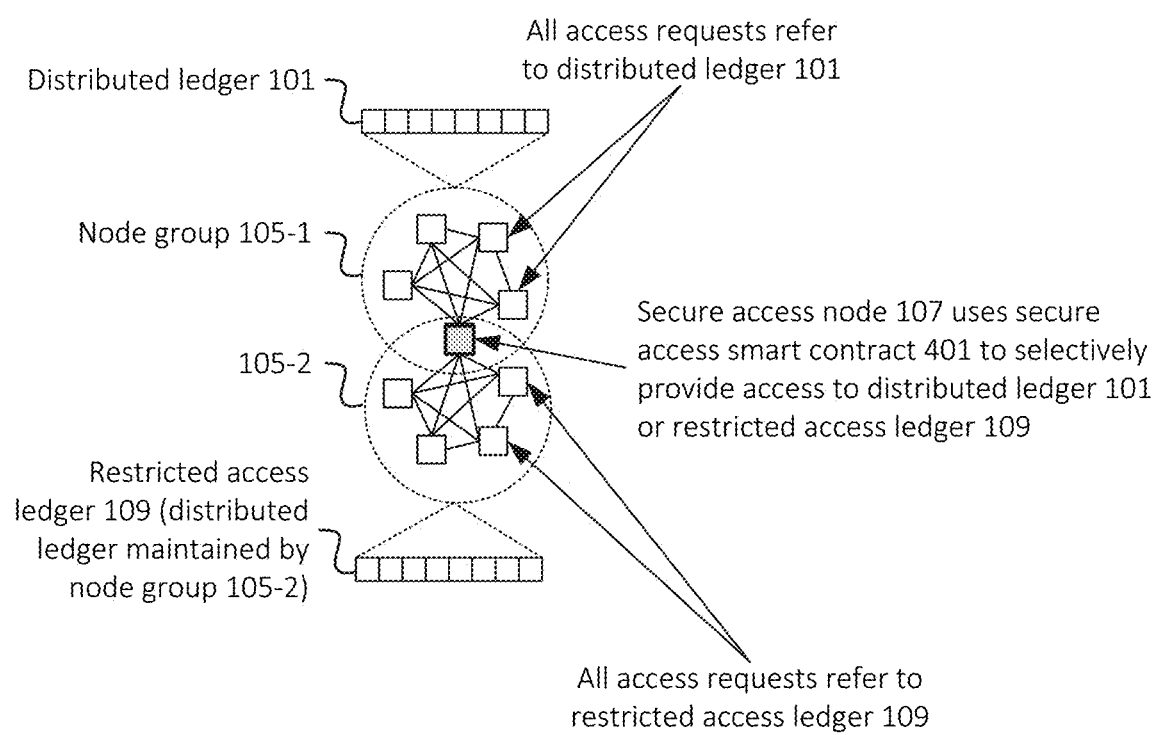
FIG. 9 illustrates an example of a restricted access ledger that is maintained in a distributed manner, in accordance with some embodiments.

While restricted access ledger 109 is described above as being maintained by a particular node (e.g., Secure Access Node 107), restricted access ledger 109 may itself be implemented as a distributed ledger. For example, as shown in FIG. 9, node group 105-1 may maintain distributed ledger 101, and may include Secure Access Node 107. That is, Secure Access Node 107 may maintain a respective local copy local copy 307 of distributed ledger 101 (e.g., including respective payloads 305), as well as restricted access ledger 109 based on distributed ledger 101 (e.g., which includes modified payloads 311). Secure Access Node 107 may also be a node of node group 105-2, which maintains restricted access ledger 109. That is, the respective nodes 103 of node group 105-2, including Secure Access Node 107, may maintain restricted access ledger 109. In this manner, nodes 103 of node group 105-1 (e.g., other than Secure Access Node 107) may treat access requests received by such nodes 103 as requests to access distributed ledger 101. In some embodiments, nodes 103 of node group 105-1 may perform suitable authentication and/or authorization techniques to verify that access to distributed ledger 101 is permitted by entities requesting access to distributed ledger 101. In this manner, distributed ledger 101 as maintained by nodes 103 of node group 105-1 may be secure or protected from entities that are not authorized to access distributed ledger 101, but nodes 103 of node group 105-1 that do not maintain restricted access ledger 109 may not be able to further provide different levels of access to distributed ledger 101 (e.g., including obscured, scrambled, filtered, etc. versions of data maintained in distributed ledger 101).

Nodes 103 of node group 105-2 (e.g., other than Secure Access Node 107) may treat access requests received by such nodes 103 as requests to access restricted access ledger 109. That is, nodes 103 of node group 105-1 may be "unaware" of restricted access ledger 109, and nodes 103 of node group 105-2 may be "unaware" of distributed ledger 101. In this example, only Secure Access Node 107 may be "aware" of both distributed ledger 101 and restricted access ledger 109, and may provide differentiated access to distributed ledger 101 or restricted access ledger 109 based on access policies implemented via secure access smart contract 401, as discussed above. Maintaining restricted access ledger 109 as a separate distributed ledger may provide an enhanced level of security and trust with respect to restricted access ledger 109, as no individual node has control of restricted access ledger 109 and/or of secure access smart contract 401 as stored thereon.

Figure 10A:
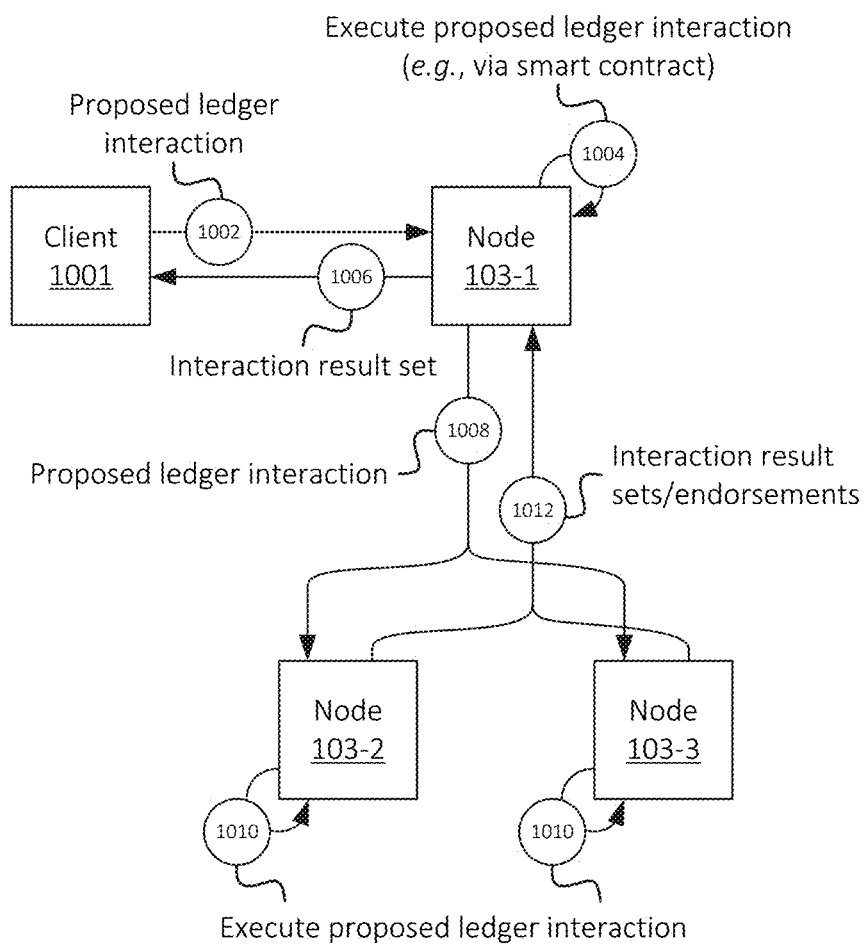
FIGS. 10A and 10B illustrate example operations associated with recording information to a distributed ledger, in accordance with some embodiments.
Figure 10B:
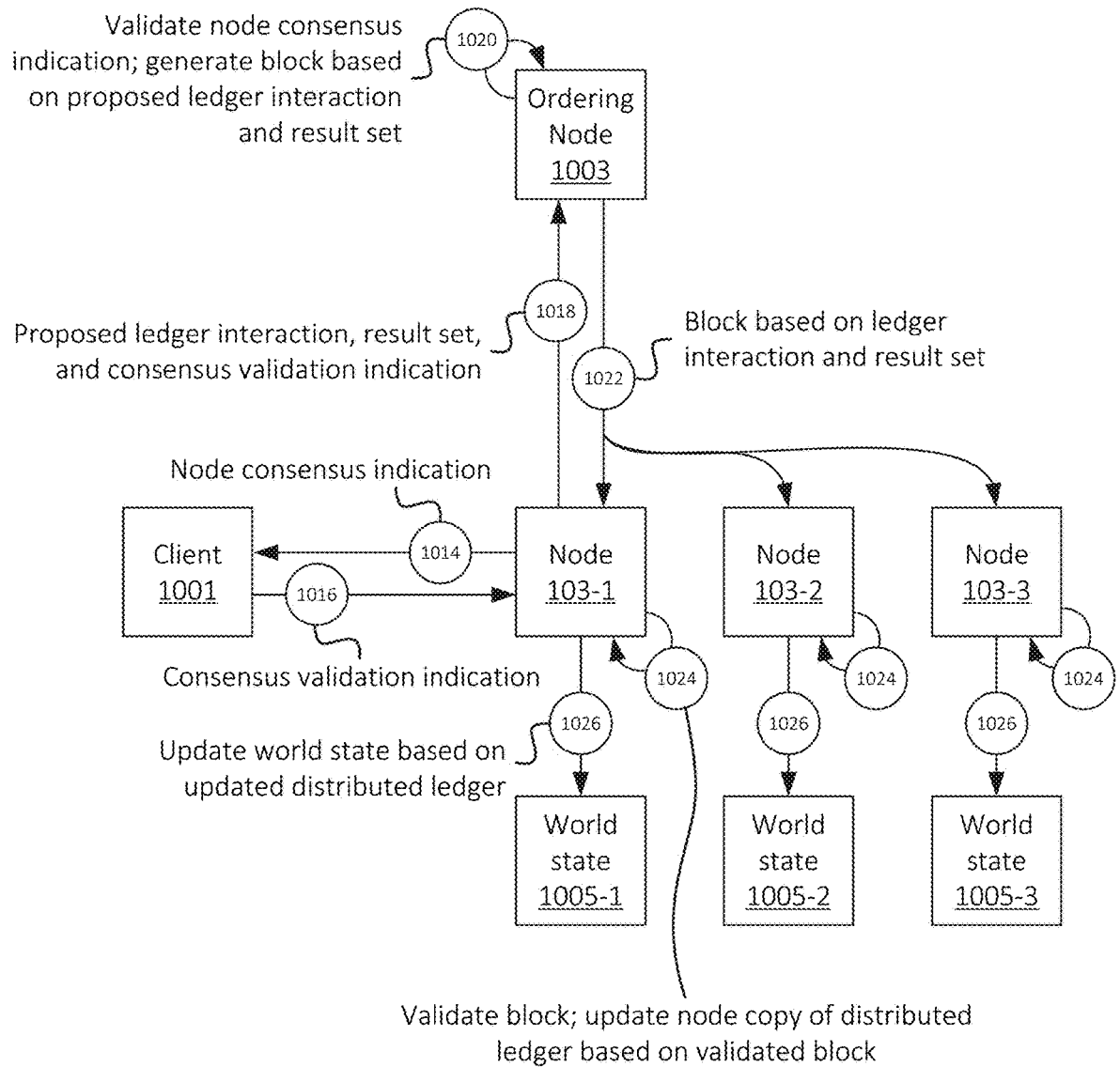

FIGS. 10A and 10B illustrate an example of modifying distributed ledger 101 and/or world state information based on an interaction with distributed ledger 101. As shown, a particular node 103-1 may receive (at 1002) a proposed ledger interaction (e.g., a request to access or record information to distributed ledger 101) from a particular source, such as client 1001 (e.g., which may be or may be implemented by a device or system that has access to node 103-1, such as a device or system that has authentication credentials, locator information, etc. via which client 1001 is able to interact with node 103-1). In some embodiments, node 103-1 may receive the proposed ledger interaction from a distributed ledger management system (e.g., which may receive the proposed ledger interaction from client 1001 and may select node 103-1 out of a group of nodes 103, such as a group of nodes associated with the same channel in a channel-based ledger system, such as the Hyperledger® Fabric), an ordering node, or other suitable device or system.

Client 1001 may be, for example, an entity associated with distributed ledger 101 (e.g., may be associated with an address, a "wallet," a decentralized application ("dApp"), etc.). In this example, assume that client 1001 is authorized to initiate, request, etc. the proposed ledger interaction, which may include the modification of one or more values of one or more attributes that are currently associated with distributed ledger 101, the addition of one or more attributes to distributed ledger 101, or other suitable interactions. In other examples, node 103-1 and/or some other device or system may verify that client 1001 is authorized to initiate the proposed ledger interaction. The proposed ledger interactions may be specified in one or more smart contracts, as specified by access parameters associated with distributed ledger 101.

In some embodiments, the proposed ledger interaction (received at 1002) may indicate a smart contract recorded to distributed ledger 101, which may specify one or more inputs (e.g., types of inputs, quantity of inputs, and/or other input parameters), and may also include actions to take with respect to the inputs in order to generate one or more outputs (e.g., chaincode). For example, the proposed ledger interaction may specify a particular smart contract (e.g., an address associated with distributed ledger 101 with which the smart contract is associated) and one or more input values according to input parameters specified by the particular smart contract. In some examples, the proposed ledger interaction may refer to one or more values that have previously been recorded to distributed ledger 101 (and thus reflected in world state information associated with distributed ledger 101), such as an interaction that increments or decrements previously recorded values or performs other computations based on previously recorded values.

Node 103-1 may execute (at 1004) the proposed ledger interaction, which may include accessing the one or more values that were previously recorded to distributed ledger 101. In order to determine the one or more values referred to in the proposed ledger interaction, node 103-1 may access world state information, maintained by node 103-1, to determine such values. Such access may include checking a local cache and/or accessing, via a network, a remote system (e.g., a "cloud" system, a containerized system, etc.) associated with node 103-1 that maintains the world state associated with distributed ledger 101. The execution (at 1004) may be a "simulation" of the proposed ledger interaction, inasmuch as the execution and of the proposed ledger interaction and the ensuing result may not yet be recorded to distributed ledger 101. The interaction may become "final" or "committed" based on validation by one or more other nodes. The result may include a "read-write set," which may include the values of the one or more attributes that were accessed (e.g., the values based on which the interaction was performed), as well as the resulting values after execution of the proposed interaction.

Node 103-1 may provide (at 1006) the result set (e.g., the read-write set) based on executing (at 1004) the proposed interaction to client 1001. Client 1001 may maintain the result set to, for example, verify and/or to provide approval of the result set before the result set is committed to distributed ledger 101. Node 103-1 may also provide (at 1008) the proposed ledger interaction to one or more other nodes 103 associated with distributed ledger 101, such as nodes 103-2 and 103-3. In some embodiments, node 103-1 may provide (at 1008) the result set generated by node 103-1 to nodes 103-2 and 103-3. Nodes 103-1 through 103-3 may all be associated with the same channel, nodes 103-2 and 103-3 may be specified by the smart contract as validators, and/or nodes 103-2 and 103-3 may otherwise be identified by node 103-1 or an associated distributed ledger management system as nodes that should validate, endorse, etc. the execution and result of the proposed interaction.

As similarly discussed with respect to node 103-1, nodes 103-2 and 103-3 may execute (at 1010), and/or simulate the execution of, the proposed interaction. Accordingly, nodes 103-2 and 103-3 may access one or more values that were previously recorded to distributed ledger 101 using world state information maintained by nodes 103-2 and 103-3. Nodes 103-2 and 103-3 may validate, verify, etc. the result set generated by node 103-1 by comparing the result set with respective result sets generated by nodes 103-2 and 103-3. Nodes 103-2 and 103-3 may respond (at 1012) to node 103-1 with respective result sets generated by nodes 103-2 and 103-3, and/or may respond with an indication, endorsement, etc. (e.g., which may be respectively signed by nodes 103-2 and 103-3) that the result set generated by node 103-1 is valid. Once node 103-1 has received endorsements from at least a threshold quantity of other nodes (e.g., from nodes 103-2 and 103-3, in this example), node 103-1 may determine that a consensus has been reached with respect to the result set for the proposed interaction.

As shown in FIG. 10B, node 103-1 may accordingly provide (at 1014), to client 1001, an indication that consensus for the result set (provided at 1006) has been reached. In some embodiments, client 1001 may validate the consensus (e.g., by evaluating signatures of nodes 103-2 and 103-3) and/or may verify the result set (e.g., by itself executing the proposed interaction). Client 1001 may provide (at 1016), to node 103-1, an indication that client 1001 has validated the consensus and/or has verified the result set. In some embodiments, the consensus validation indication may be signed by client 1001, thus securely authenticating the validation by client 1001.

Node 103-1 may provide (at 1018) the result set, along with the consensus validation indication and the proposed ledger interaction, to ordering node 1003. Ordering node 1003 may be a node, associated with the same channel as nodes 103-1 through 103-3, that validates (at 1020) the consensus validation indication (e.g., validates signatures associated with client 1001 and/or nodes 103-1 through 103-3) and generates a block, to be recorded to distributed ledger 101, that includes information regarding the ledger interaction. Such information may include an identifier of client 1001 (e.g., an address, wallet identifier, etc.), identifiers of nodes 103-1 through 103-3 that participated in generating and/or validating the result set based on the ledger interaction, smart contract inputs provided by client 1001, the consensus validation indication, one or more timestamps of the above operations and/or other events, and/or other suitable information associated with the ledger interaction. In some embodiments, the block may be signed by ordering node 1003, thus securely authenticating the block creation by ordering node 1003. At this point, the ledger interaction may no longer be a "proposed" ledger interaction, as the interaction has been finalized, committed, etc. by ordering node 1003. In some implementations, nodes 103-1 through 103-3 may be referred to as "peers," to indicate that such nodes 103-1 through 103-3 are distinct from ordering node 1003 (e.g., ordering node 1003 performs one or more different operations from the peers).

Ordering node 1003 may propagate (at 1022) the signed block, including information regarding the finalized ledger interaction initiated by client 1001, to nodes 103-1 through 103-3 and/or other nodes associated with the same channel. Nodes 103-1 through 103-3 may validate (at 1024) the block, which may include verifying the signature of ordering node 1003, and may accordingly update a respective copy of distributed ledger 101 as maintained by each one of nodes 103-1 through 103-3. Nodes 103-1 through 103-3 may maintain respective independent copies of distributed ledger 101, thus providing an element of decentralization to distributed ledger 101. As such, when adding the block (received at 1022), nodes 103-1 through 103-3 may continue to maintain separate copies of the same distributed ledger 101, including the information regarding the finalized ledger interaction.

Nodes 103-1 through 103-3 may also maintain respective world state information 1005 (e.g., world state information 1005-1 through 1005-3). For example, world state information 1005 may include a portion of the information stored in distributed ledger 101, such as the latest version of some or all of the attributes for which information has been recorded to distributed ledger 101. Nodes 103-1 through 103-3 may accordingly update (at 1026) respective copies of world state information 1005 based on the received block. For example, in the event that the block includes a change in the value of a particular attribute, nodes 103-1 through 103-3 may update world state information 1005-1 through 1005-3, respectively, to replace a previous value of the attribute (e.g., a previous version of the attribute) with the newly received value of the particular attribute.

Figure 11:
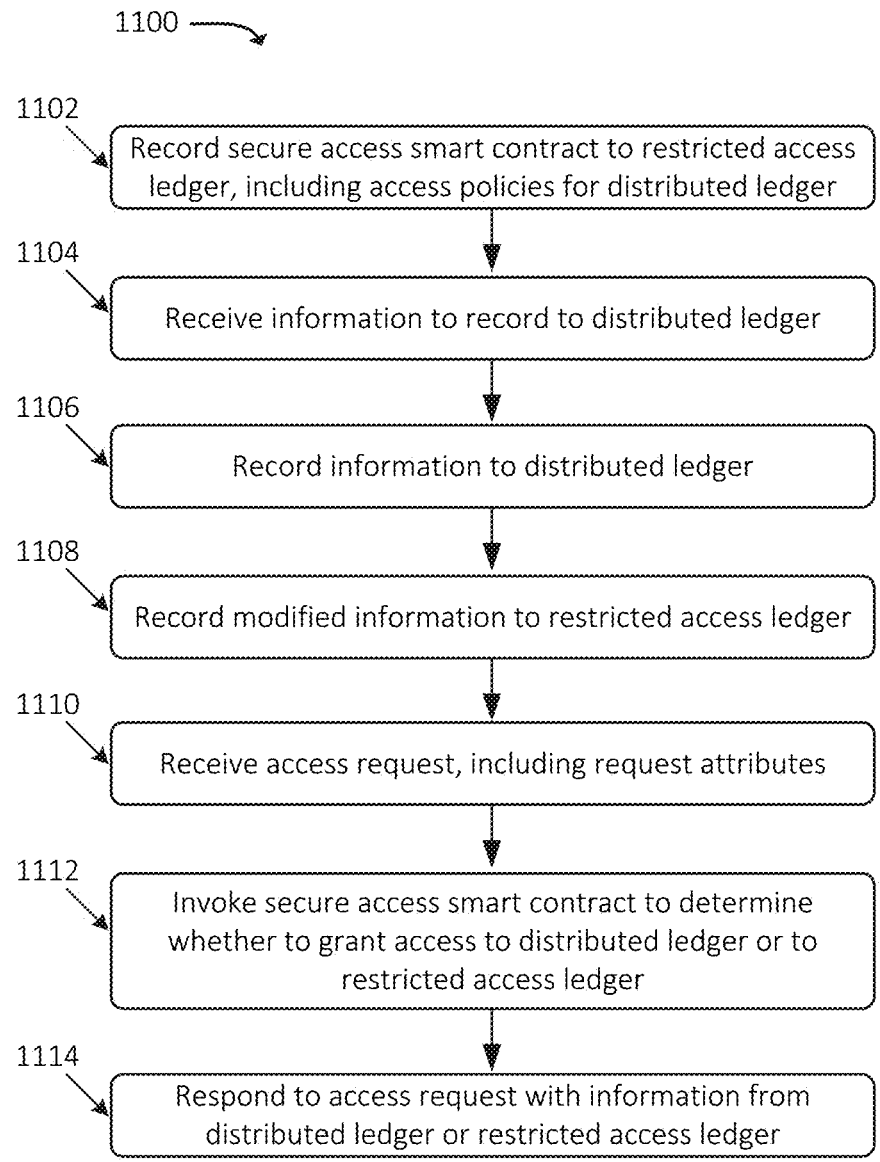
FIG. 11 illustrates an example process for maintaining a distributed ledger as well as a corresponding secure access ledger, and selectively providing access to the distributed ledger 101 or the secure access ledger based on attributes of an access request, in accordance with some embodiments.

FIG. 11 illustrates an example process 1100 for maintaining distributed ledger 101 as well as a corresponding restricted access ledger 109, and selectively providing access to distributed ledger 101 or restricted access ledger 109 based on attributes of an access request. In some embodiments, some or all of process 1100 may be performed by Secure Access Node 107.

As shown, process 1100 may include recording (at 1102) smart access smart contract 401 to restricted access ledger 109. As discussed above, secure access smart contract 401 may include access policies for secure access to a particular distributed ledger 101, such as an identifier or attributes of a user issuing an access request, an identifier or attributes of a device from which the access request is received, a time at which the access request is received, a location from which the access request is received, query attributes of the access request, or other suitable policies or conditions.

Process 1100 may further include receiving (at 1104) information to record to distributed ledger 101. For example, as discussed above, Secure Access Node 107 may, along with one or more other nodes 103, be in a node group 105 that maintains distributed ledger 101 (e.g., Secure Access Node 107 and the one or more other nodes 103 may maintain respective local copies of distributed ledger 101, where the other nodes 103 may not maintain or participate in restricted access ledger 109). The information to record to distributed ledger 101 may include a block that has been proposed, validated, etc. in accordance with one or more consensus and/or verification techniques as discussed above.

Process 1100 may additionally include recording (at 1106) the information to distributed ledger 101. For example, Secure Access Node 107 may add, append, etc. the received information to a respective local copy 307 of distributed ledger 101. Recording the information may include recording metadata and payload information associated with the received information. Secure Access Node 107 may, for example, record the information as received to distributed ledger 101, without modifying the information (e.g., without modifying a payload of the received information).

Process 1100 may also include recording (at 1108) a modified version of the information to restricted access ledger 109. For example, Secure Access Node 107 may modify a portion of the received information, such as by modifying a payload of the information, which may include deleting the payload, replacing the entire payload with different information (e.g., scrambled, hashed, randomized, etc. information), or replacing a portion of the payload with different information. For example, as discussed above, Secure Access Node 107 may analyze the payload using NLP techniques, AI/ML techniques, etc. to identify sensitive information or other information to modify, obscure, mask, etc. In some embodiments, recording the modified version of the information may include recording some or all of the original metadata with the modified version of the payload. For example, the same block identifier, record identifier, transaction identifier, etc. as recorded to restricted access ledger 109 may be associated with the metadata and the modified payload.

Process 1100 may further include receiving (at 1110) an access request, including request attributes. In some embodiments, the access request may indicate an identifier of distributed ledger 101 (e.g., a ledger identifier, a channel identifier, a chain identifier, etc.). As discussed above, the attributes of the request may include query parameters (e.g., query terms, filters, keywords, etc.), an identifier or attributes of a device from which the request was submitted, an identifier or attributes of a user that submitted the request, or other suitable attributes that may be detected or identified by Secure Access Node 107.

Process 1100 may additionally include determining (at 1112) whether to grant access to distributed ledger 101 or to restricted access ledger 109 based on the received request. As discussed above, such determining may include invoking a smart contract, such as secure access smart contract 401. In some embodiments, secure access smart contract 401 may be recorded to restricted access ledger 109. In some embodiments, secure access smart contract 401 may be recorded to another ledger (e.g., which may be locally maintained by Secure Access Node 107 or some other device, or which may be maintained via a distributed ledger technique). Additionally, or alternatively, restricted access ledger 109 may utilize some other suitable mechanism to determine whether to grant access, based on the request, to distributed ledger 101 or to restricted access ledger 109. In embodiments where such determining includes invoking secure access smart contract 401, Secure Access Node 107 may provide some or all of the attributes of the request as input, and the output of secure access smart contract 401 may be an indication of whether to fulfill the request by accessing distributed ledger 101 or Secure Access Node 107, and/or other suitable indication based on which Secure Access Node 107 may determine whether to grant access to distributed ledger 101 or to restricted access ledger 109.

Process 1100 may also include responding (at 1114) to the request with information from the selected distributed ledger 101 or restricted access ledger 109. For example, Secure Access Node 107 may access distributed ledger 101 (e.g., by searching for query terms or criteria specified in the request) in situations where Secure Access Node 107 determines that access to distributed ledger 101 should be provided (e.g., based on invoking secure access smart contract 401), and may instead access restricted access ledger 109 in situations where Secure Access Node 107 determines that access to restricted access ledger 109 should be provided (e.g., when determining that access to distributed ledger 101 should not be provided). Responding to the request may include providing suitable payload information and/or metadata information (e.g., payloads 305 from distributed ledger 101 or modified payloads 311 from restricted access ledger 109, as applicable), as discussed above.

Figure 12:
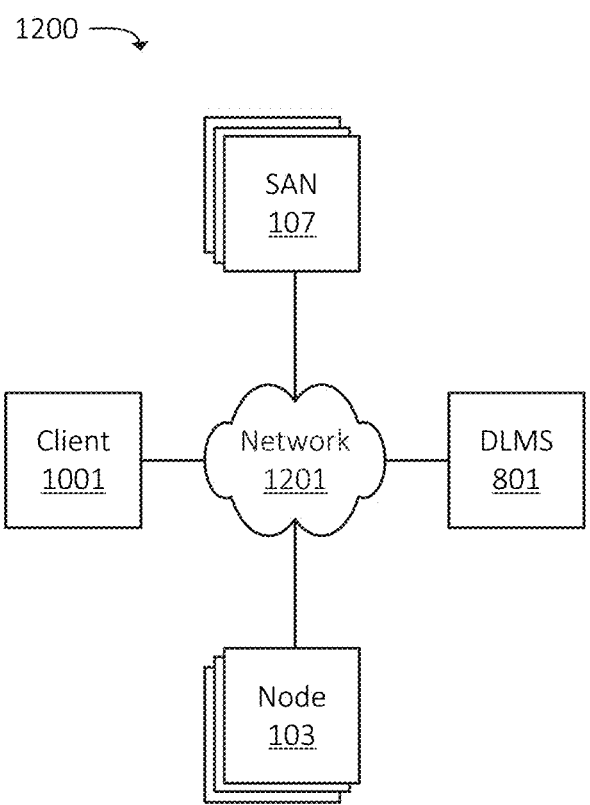
FIG. 12 illustrates an example environment in which one or more embodiments, described herein, may be implemented.

FIG. 12 illustrates an example environment 1200, in which one or more embodiments may be implemented. Environment 1200 may include network 1201, client 1001, DLMS 801, nodes 103, and/or one or more Secure Access Nodes 107. In some embodiments, environment 1200 may include one or more additional devices or systems communicatively coupled to network 1201 and/or one or more other networks.

The quantity of devices and/or networks, illustrated in FIG. 12, is provided for explanatory purposes only. In practice, environment 1200 may include additional devices and/or networks, fewer devices and/or networks, different devices and/or networks, or differently arranged devices and/or networks than illustrated in FIG. 12. For example, while not shown, environment 1200 may include devices that facilitate or enable communication between various components shown in environment 1200, such as routers, modems, gateways, switches, hubs, etc. In some implementations, one or more devices of environment 1200 may be physically integrated in, and/or may be physically attached to, one or more other devices of environment 1200. Alternatively, or additionally, one or more of the devices of environment 1200 may perform one or more network functions described as being performed by another one or more of the devices of environment 1200. Elements of environment 1200 may interconnect with each other and/or other devices via wired connections, wireless connections, or a combination of wired and wireless connections. Some or all of the elements of environment 1200 may be implemented by one or more devices, sets of hardware resources, cloud systems, or the like.

Network 1201 may include one or more wired and/or wireless networks. For example, network 1201 may include an IP-based Packet Data Network ("PDN"), a wide area network ("WAN") such as the Internet, a private enterprise network, and/or one or more other networks. Client 1001, DLMS 801, nodes 103, Secure Access Nodes 107, and/or other devices or systems may communicate, through network 1201, with each other and/or with other devices that are coupled to network 1201. Network 1201 may be connected to one or more other networks, such as a public switched telephone network ("PSTN"), a public land mobile network ("PLMN"), and/or another network. Network 1201 may be connected to one or more devices, such as content providers, applications, web servers, and/or other devices, with which client 1001, DLMS 801, nodes 103, Secure Access Nodes 107, and/or other devices or systems may communicate.

Client 1001, DLMS 801, nodes 103, Secure Access Nodes 107, and/or other devices or systems may be implemented by one or more cloud systems, server devices, or other types of hardware resources. In some embodiments, client 1001, DLMS 801, nodes 103, and/or Secure Access Nodes 107 may be implemented by or communicatively coupled to a User Equipment ("UE"), which may include a computation and communication device, such as a wireless mobile communication device that is capable of communicating with network 1201. The UE may communicate with network 1201 via a wired or a wireless interface, such as via one or more radio access network ("RANs"), such as a Fifth Generation ("5G") RAN, a Long-Term Evolution ("LTE") RAN, etc. The UE may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, a wearable device, a Machine-to-Machine ("M2M") device, or the like), a Fixed Wireless Access ("FWA") device, or another type of mobile computation and communication device.

Figure 13:
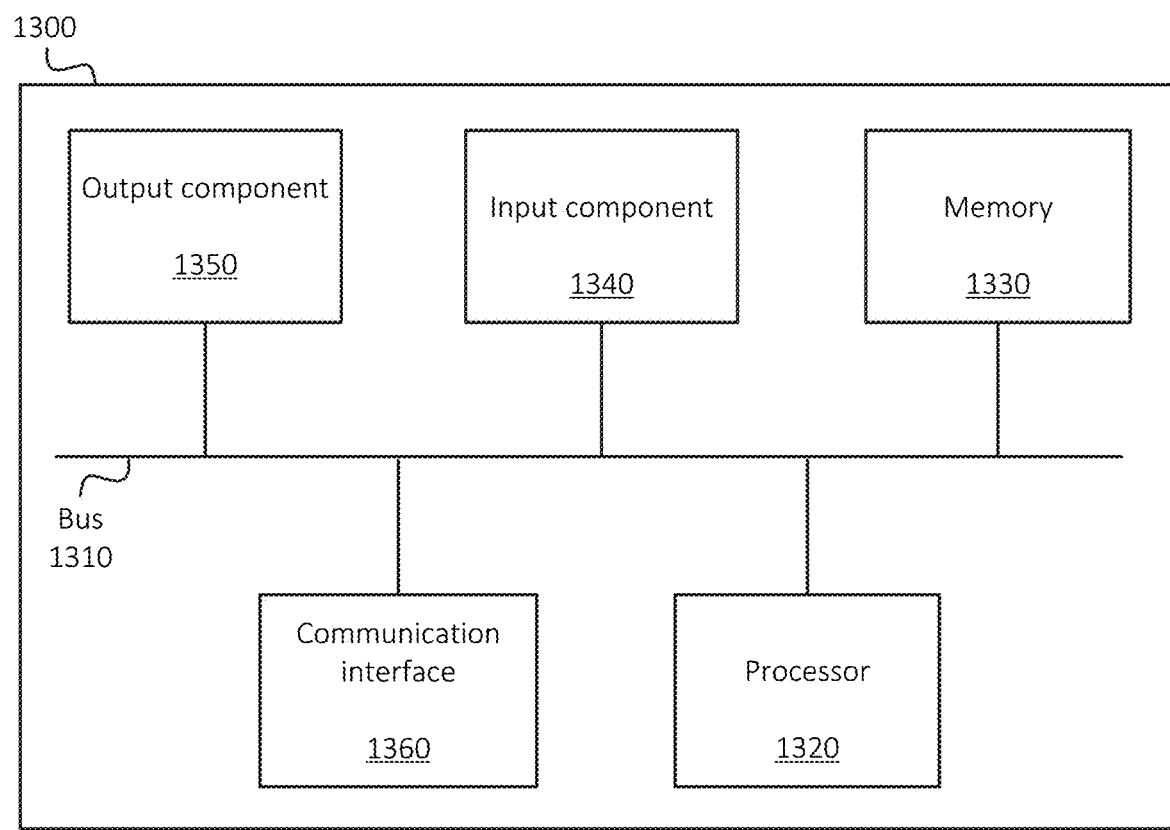
FIG. 13 illustrates example components of one or more devices, in accordance with one or more embodiments described herein.

FIG. 13 illustrates example components of device 1300. One or more of the devices described above may include one or more devices 1300. Device 1300 may include bus 1310, processor 1320, memory 1330, input component 1340, output component 1350, and communication interface 1360. In another implementation, device 1300 may include additional, fewer, different, or differently arranged components.

Bus 1310 may include one or more communication paths that permit communication among the components of device 1300. Processor 1320 may include a processor, microprocessor, or processing logic that may interpret and execute instructions (e.g., processor-executable instructions). In some embodiments, processor 1320 may be or may include one or more hardware processors. Memory 1330 may include any type of dynamic storage device that may store information and instructions for execution by processor 1320, and/or any type of non-volatile storage device that may store information for use by processor 1320.

Input component 1340 may include a mechanism that permits an operator to input information to device 1300 and/or other receives or detects input from a source external to input component 1340, such as a touchpad, a touchscreen, a keyboard, a keypad, a button, a switch, a microphone or other audio input component, etc. In some embodiments, input component 1340 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1350 may include a mechanism that outputs information to the operator, such as a display, a speaker, one or more light emitting diodes ("LEDs"), etc.

Communication interface 1360 may include any transceiver-like mechanism that enables device 1300 to communicate with other devices and/or systems. For example, communication interface 1360 may include an Ethernet interface, an optical interface, a coaxial interface, or the like. Communication interface 1360 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1300 may include more than one communication interface 1360. For instance, device 1300 may include an optical interface and an Ethernet interface.

Device 1300 may perform certain operations relating to one or more processes described above. Device 1300 may perform these operations in response to processor 1320 executing instructions, such as software instructions, processor-executable instructions, etc. stored in a computer-readable medium, such as memory 1330. A computer-readable medium may be defined as a non-transitory memory device. A memory device may include space within a single physical memory device or spread across multiple physical memory devices. The instructions may be read into memory 1330 from another computer-readable medium or from another device. The instructions stored in memory 1330 may be processor-executable instructions that cause processor 1320 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-11), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more hardware processors configured to:
      maintain a local copy of a distributed ledger that is maintained by one or more other devices, wherein the distributed ledger includes a first set of records that each include payload information, wherein the first set of records includes a first record that is associated with:
         a particular payload, and
         a particular record identifier;
      maintain a restricted access ledger that is based on the distributed ledger, wherein the restricted access ledger includes a second set of records that include modified versions of payload information included in the first set of records of the distributed ledger, wherein the second set of records includes a second record that includes:
         a modified version of the particular payload of the first record of the first set of records, and
         the particular record identifier;
      receive a request to access the distributed ledger, wherein the request includes the particular record identifier and one or more attributes;
      determine, based on the one or more attributes of the request, a particular access level associated with the request; and
      selectively provide, based on the particular record identifier included in the request, either the particular payload or the modified version of the particular payload in response to the request based on the particular access level associated with the request, wherein the selectively providing includes:
         when determining that the particular access level associated with the request is a first access level, providing the particular payload information, included in the first record of the distributed ledger, in response to the request; and
         when determining that the particular access level associated with the request is a second access level, providing the modified version of the particular payload information, included in the second record of the restricted access ledger, in response to the request.

2. The device of claim 1, wherein the restricted access ledger includes one or more smart contracts, wherein determining whether to grant access to the distributed ledger or to the restricted access ledger includes invoking the one or more smart contracts.

3. The device of claim 2, wherein invoking the one or more smart contracts includes providing the one or more attributes of the request as input the one or more smart contracts, and wherein an output of the one or more smart contracts includes an indication of whether to provide access to the distributed ledger or to the restricted access ledger.

4. The device of claim 1, wherein the one or more attributes of the request include at least one of:
   one or more query parameters,
   an identifier of a device from which the request was received, or
   an identifier of a user associated with the request.

5. The device of claim 1,
   wherein the distributed ledger is a first distributed ledger, wherein the one or more other devices, that maintain the distributed ledger, are a first set of devices,
   wherein the restricted access ledger is a second distributed ledger that is maintained by a second set of devices.

6. The device of claim 1, wherein the particular payload is a first payload, wherein the one or more hardware processors are further configured to:
   receive information to record to the distributed ledger, wherein the information includes a second payload;
   record the information to the distributed ledger, including the second payload; and
   record a modified version of the information to the restricted access ledger, wherein the restricted access ledger includes a modified version of the second payload in lieu of including the second payload.

7. The device of claim 6,
   wherein the information to record to the distributed ledger further includes particular metadata,
   wherein recording the information to the distributed ledger includes recording the particular metadata to the distributed ledger, and
   wherein recording the information to the restricted access ledger includes recording the particular metadata to the restricted access ledger.

8. A non-transitory computer-readable medium, storing a plurality of processor-executable instructions to:
   maintain a local copy of a distributed ledger that is maintained by one or more other devices, wherein the distributed ledger includes a first set of records that each include payload information, wherein the first set of records includes a first record that is associated with:
      a particular payload, and
      a particular record identifier;
   maintain a restricted access ledger that is based on the distributed ledger, wherein the restricted access ledger includes a second set of records that include modified versions of payload information included in the first set of records of the distributed ledger, wherein the second set of records includes a second record that includes:
      a modified version of the particular payload of the first record of the first set of records, and
      the particular record identifier;
   receive a request to access the distributed ledger, wherein the request includes the particular record identifier and one or more attributes;
   determine, based on the one or more attributes of the request, a particular access level associated with the request; and
   selectively provide, based on the particular record identifier included in the request, either the particular payload or the modified version of the particular payload in response to the request based on the particular access level associated with the request, wherein the selectively providing includes:
      when determining that the particular access level associated with the request is a first access level, providing the particular payload information, included in the first record of the distributed ledger, in response to the request; and
      when determining that the particular access level associated with the request is a second access level, providing the modified version of the particular payload information, included in the second record of the restricted access ledger, in response to the request.

9. The non-transitory computer-readable medium of claim 8, wherein the restricted access ledger includes one or more smart contracts, wherein determining whether to grant access to the distributed ledger or to the restricted access ledger includes invoking the one or more smart contracts.

10. The non-transitory computer-readable medium of claim 9, wherein invoking the one or more smart contracts includes providing the one or more attributes of the request as input the one or more smart contracts, and wherein an output of the one or more smart contracts includes an indication of whether to provide access to the distributed ledger or to the restricted access ledger.

11. The non-transitory computer-readable medium of claim 8, wherein the one or more attributes of the request include at least one of:
   one or more query parameters,
   an identifier of a device from which the request was received, or
   an identifier of a user associated with the request.

12. The non-transitory computer-readable medium of claim 8,
   wherein the distributed ledger is a first distributed ledger, wherein the one or more other devices, that maintain the distributed ledger, are a first set of devices,
   wherein the restricted access ledger is a second distributed ledger that is maintained by a second set of devices.

13. The non-transitory computer-readable medium of claim 8, wherein the particular payload is a first payload, wherein the plurality of processor-executable instructions further include processor-executable instructions to:
   receive information to record to the distributed ledger, wherein the information includes a second payload;
   record the information to the distributed ledger, including the second payload; and
   record a modified version of the information to the restricted access ledger, wherein the restricted access ledger includes a modified version of the second payload in lieu of including the second payload.

14. The non-transitory computer-readable medium of claim 13,
   wherein the information to record to the distributed ledger further includes particular metadata,
   wherein recording the information to the distributed ledger includes recording the particular metadata to the distributed ledger, and
   wherein recording the information to the restricted access ledger includes recording the particular metadata to the restricted access ledger.

15. A method, comprising:
maintaining a local copy of a distributed ledger that is maintained by one or more other devices, wherein the distributed ledger includes a first set of records that each include payload information, wherein the first set of records includes a first record that is associated with:
a particular payload, and
a particular record identifier;
maintaining a restricted access ledger that is based on the distributed ledger, wherein the restricted access ledger includes a second set of records that include modified versions of payload information included in the first set of records of the distributed ledger, wherein the second set of records includes a second record that includes:
a modified version of the particular payload of the first record of the first set of records, and
the particular record identifier;
receiving a request to access the distributed ledger, wherein the request includes the particular record identifier and one or more attributes;
determine, based on the one or more attributes of the request, a particular access level associated with the request; and
selectively provide, based on the particular record identifier included in the request, either the particular payload or the modified version of the particular payload in response to the request based on the particular access level associated with the request, wherein the selectively providing includes:
when determining that the particular access level associated with the request is a first access level, providing the particular payload information, included in the first record of the distributed ledger, in response to the request; and
when determining that the particular access level associated with the request is a second access level, providing the modified version of the particular payload information, included in the second record of the restricted access ledger, in response to the request.

16. The method of claim 15, wherein the restricted access ledger includes one or more smart contracts, wherein determining whether to grant access to the distributed ledger or to the restricted access ledger includes invoking the one or more smart contracts.

17. The method of claim 16, wherein invoking the one or more smart contracts includes providing the one or more attributes of the request as input the one or more smart contracts, and wherein an output of the one or more smart contracts includes an indication of whether to provide access to the distributed ledger or to the restricted access ledger.

18. The method of claim 15, wherein the one or more attributes of the request include at least one of:
one or more query parameters,
an identifier of a device from which the request was received, or
an identifier of a user associated with the request.

19. The method of claim 15,
wherein the distributed ledger is a first distributed ledger, wherein the one or more other devices, that maintain the distributed ledger, are a first set of devices,
wherein the restricted access ledger is a second distributed ledger that is maintained by a second set of devices.

20. The method of claim 15, wherein the particular payload is a first payload, the method further comprising:
receiving information to record to the distributed ledger, wherein the information includes a second payload;
recording the information to the distributed ledger, including the second payload; and
recording a modified version of the information to the restricted access ledger, wherein the restricted access ledger includes a modified version of the second payload in lieu of including the second payload.

\* \* \* \* \*